United States Patent
Mack et al.

(10) Patent No.: US 8,249,554 B2
(45) Date of Patent: Aug. 21, 2012

(54) METHODS FOR PROVISIONING MOBILE STATIONS AND WIRELESS COMMUNICATIONS WITH MOBILE STATIONS LOCATED WITHIN FEMTOCELLS

(75) Inventors: Karl Mack, Schaumburg, IL (US); Donna Michaels Sand, Redmond, WA (US); Hong Xie, Lisle, IL (US); Sarvar Patel, Montville, NJ (US); Robin Jeffrey Thompson, Batavia, IL (US)

(73) Assignee: Alcatel Lucent, Paris (FR)

( * ) Notice: Subject to any disclaimer, the term of this patent is extended or adjusted under 35 U.S.C. 154(b) by 680 days.

(21) Appl. No.: 12/216,096

(22) Filed: Jun. 30, 2008

(65) Prior Publication Data
US 2009/0111427 A1    Apr. 30, 2009

Related U.S. Application Data

(60) Provisional application No. 61/000,575, filed on Oct. 26, 2007.

(51) Int. Cl.
*H04M 1/68* (2006.01)
*H04W 4/00* (2009.01)

(52) U.S. Cl. .................... 455/411; 455/435.1

(58) Field of Classification Search .......... 455/410–411; 380/247–250; 379/161, 184, 168, 194
See application file for complete search history.

(56) References Cited

U.S. PATENT DOCUMENTS

| | | | |
|---|---|---|---|
| 6,138,018 A | 10/2000 | Pashtan et al. | |
| 6,788,676 B2 * | 9/2004 | Partanen et al. | 370/352 |
| 2007/0043947 A1 * | 2/2007 | Mizikovsky et al. | 713/172 |

OTHER PUBLICATIONS

"Hypertext Transfer Protocol (HTTP) Digest Authentication Using Authentication and Key Agreement (AKA)" Network Working Group. Sep. 2002.*
International Preliminary Report on Patentability and Written Opinion for International Application No. PCT/US2008/011751 dated May 6, 2010.
Tatara Systems, "SIP Based Architecture for Integration of 1xRTT Femtocells," 3GPP2 TSG-S, [Online] Oct. 13, 2007, pp. 1-26, XP002539795, Retrieved from the Internet: URL:ftp:3gpp2.org/TSGS/Working/_2007/2007-10-Femto_Cell_Workshop-Boston/S00-FEMTO-20071015-002_Tatara%20Submission-1xRTT_Femtocells_in_SIP_Architecture.pdf.

(Continued)

*Primary Examiner* — Kamran Asfshar
*Assistant Examiner* — Kashif Siddiqui
(74) *Attorney, Agent, or Firm* — Harness, Dickey & Pierce, P.L.C.

(57) ABSTRACT

A method for wireless communications with mobile stations located within a femtocell is described. The method includes registering a femtocell with an IMS core network to receive IMS services for one or more mobile stations located within the femtocell, and separately registering the mobile station with an application server to provide additional services to the mobile station located within the femtocell. The additional services may be CDMA services. Also, registering the femtocell with the IMS core network may include transmitting femtocell registration information that does not include information regarding the mobile station to the IMS core network to request IMS services for the mobile station.

18 Claims, 16 Drawing Sheets

OTHER PUBLICATIONS

Airvana, "Femto SIP/IMS and Convergence Server (CSRV) Architecture and Stage 2 Description," 3GPP TSG-S, [Online] Oct. 15, 2007, pp. 1-28, XP002539796, Retrieved from the Internet: URL:ftp//ftp.3gpp2.org/TSGS/Working/_2007/2007-10-Femto_Cell_Workshop-Boston/S00-FEMTO-20071015-016_Airvana_1x_IMS_Architecture%20R2.pdf.

Airvana, "Tutorial on Femtocell Technology and SIP/IMS-based Femto Network Architectures," 3GPP TSG-S, [Online] Oct. 15, 2007, pp. 1-68, XP002539797, Retrieved from the Intenet: URL:ftp://ftp.3gpp2.org/TSGS/Working/_2007/2007-10-Femto_Cell_Workshop-Boston/S00-FEMTO-20071015-016_Airvana_Femto%20Overview%20Architecture%20R2.pdf.

Digital Cellular Telecommications System (Phase 2+), Universal Mobile Telecommunications System (UMTS), IP Multimedia (IM) Session Handling, IM Call Model, Stage 2 (3GPP TS 23.218 version 7.7.1 Release 7), ETSI TS 123 218, ETSI Standards, LIS, Sophia Antipolis Cedex, France, vol. 3-CN1, No. V7.7.1, Oct. 1, 2007, pp. 1-62.

International Search Report and Written Opinion dated Aug. 18, 2009.

Sung, Dan Keun, "Mobile Communications Systems (MCS)." Fall 2000.

Korean Office Action dated Jul. 21, 2011.

* cited by examiner

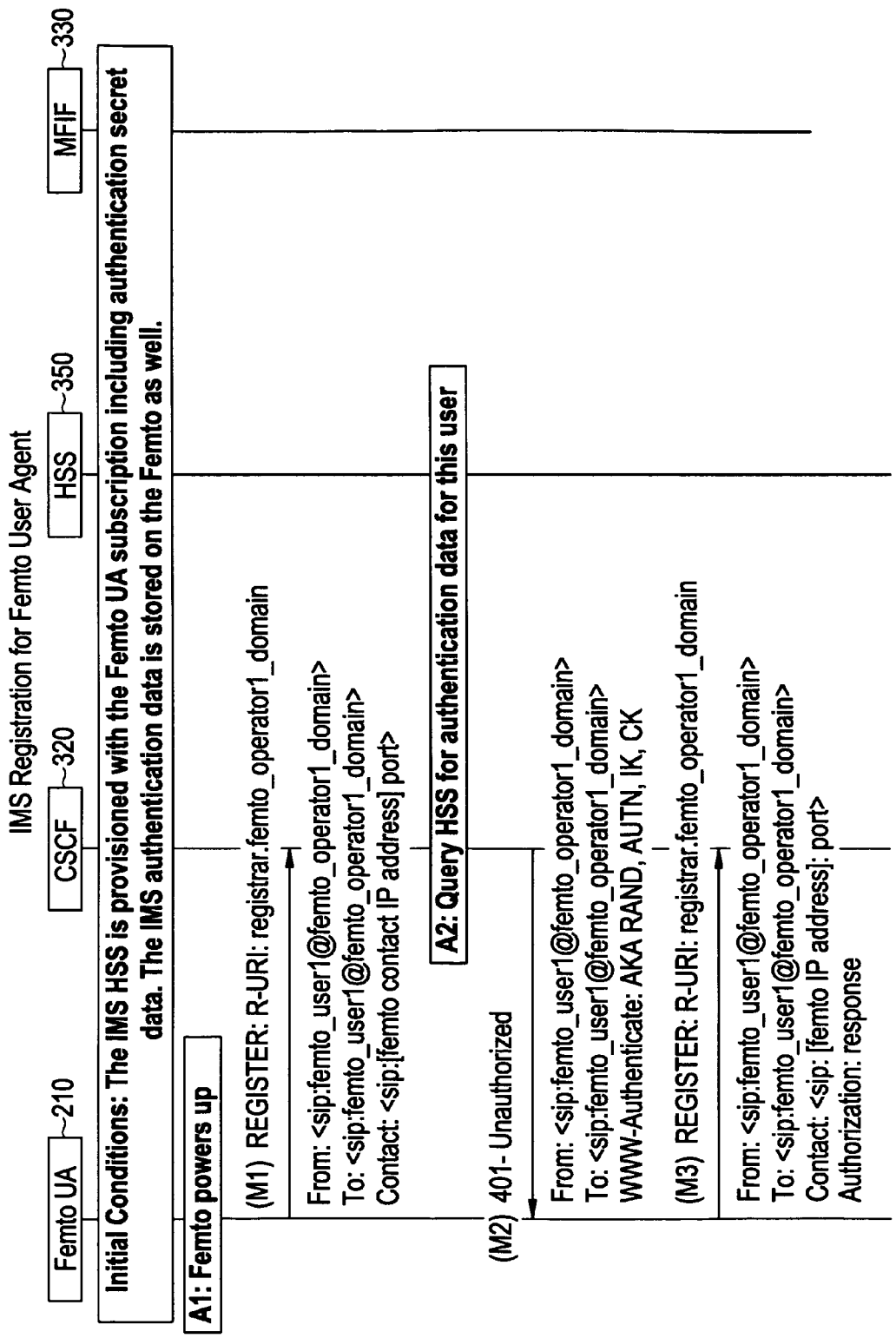

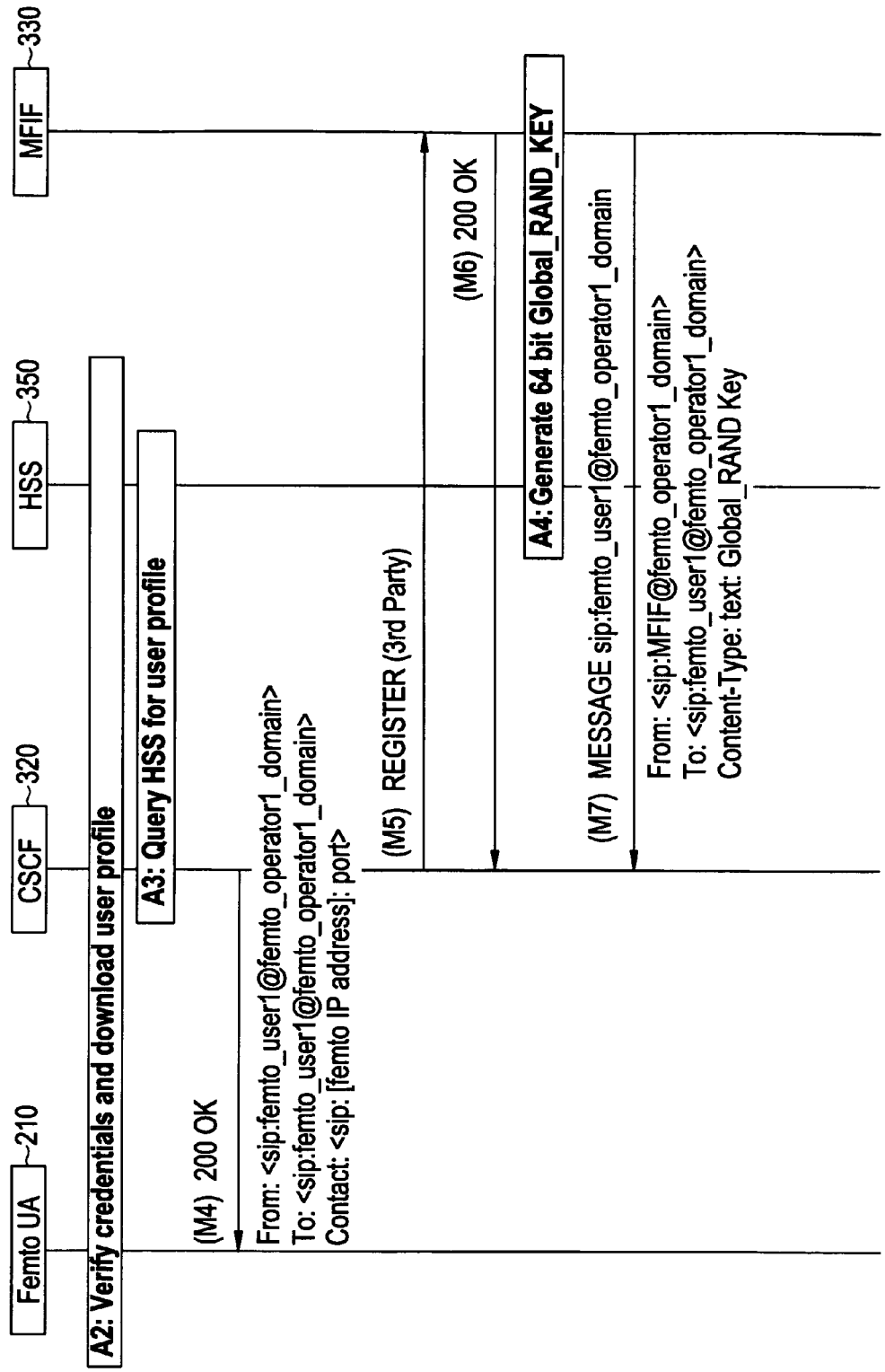

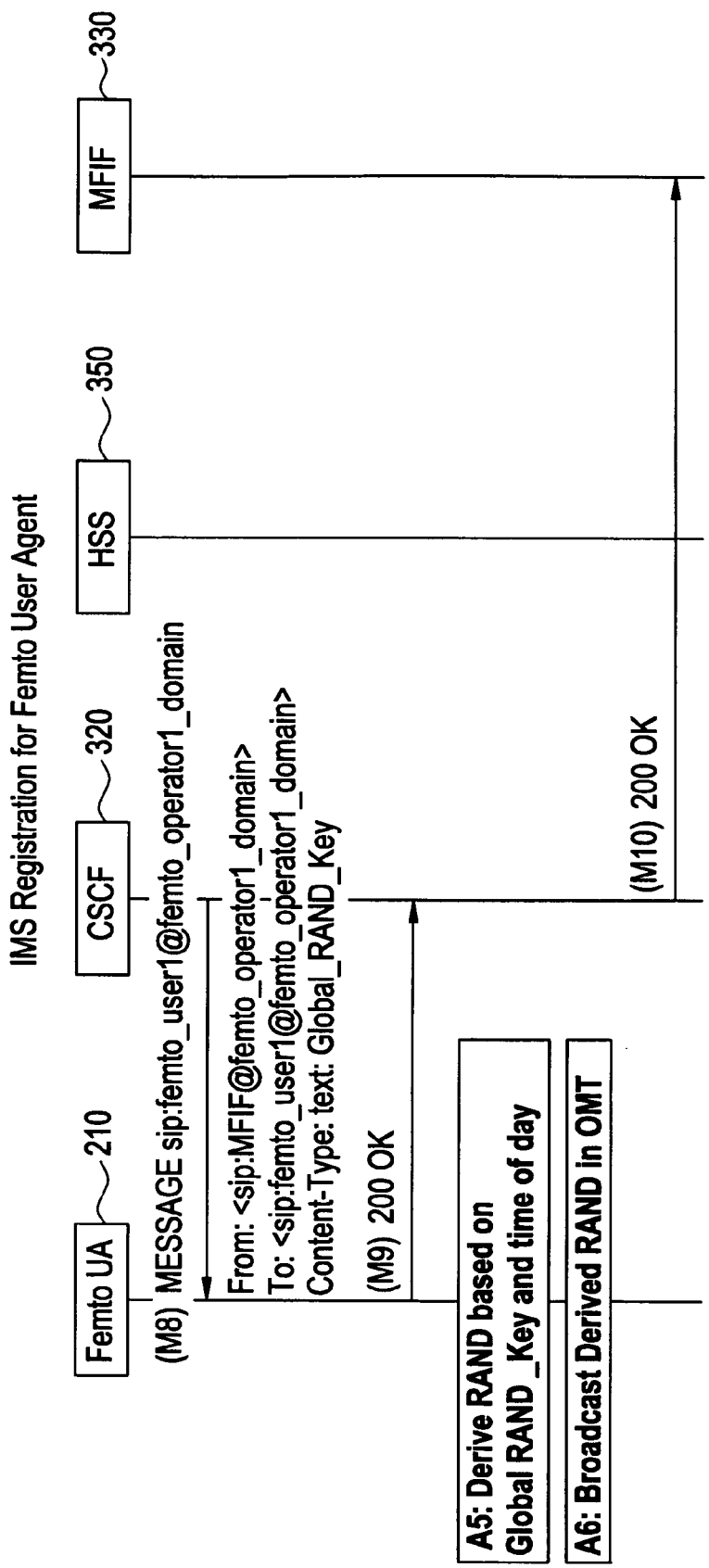

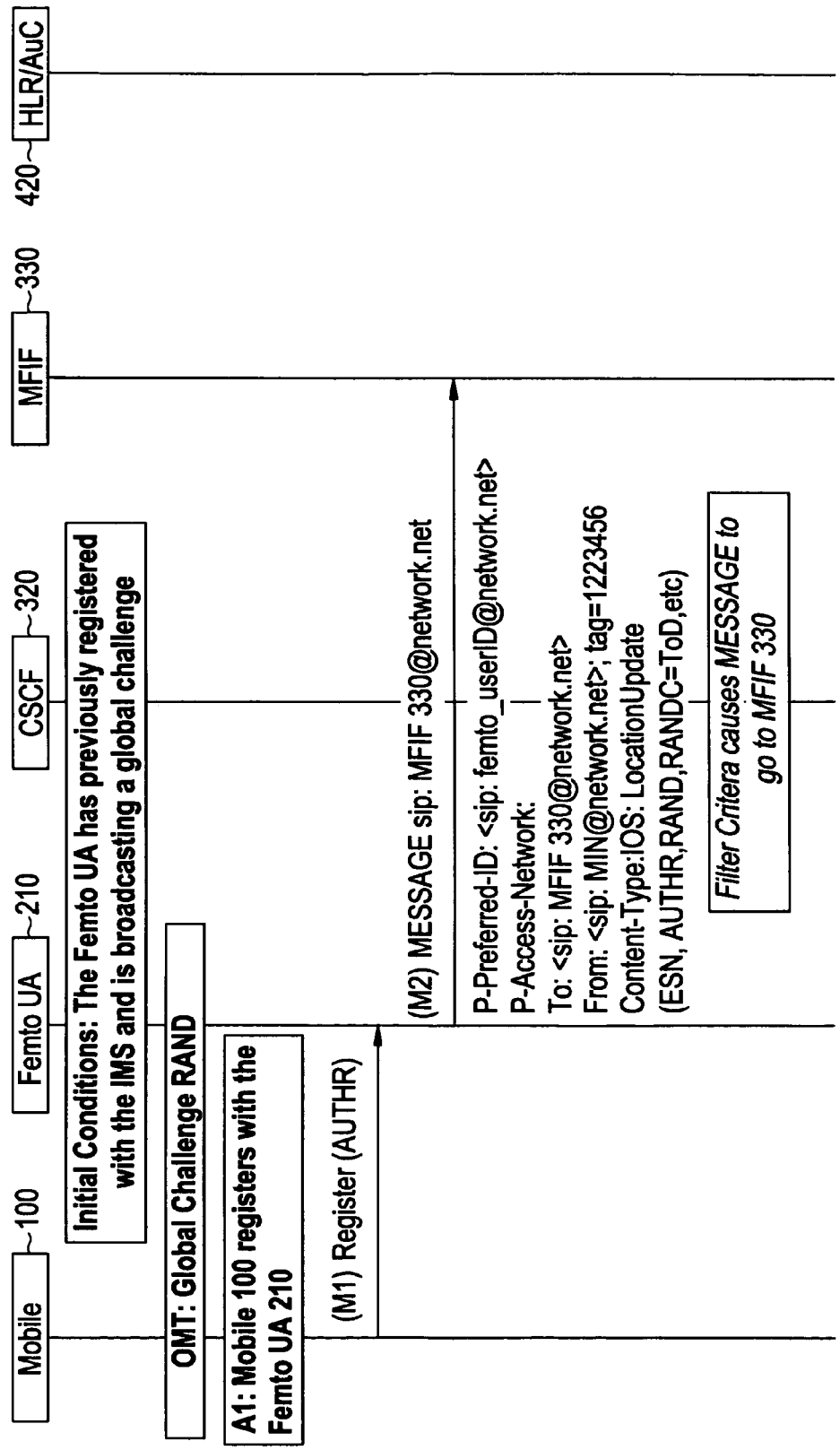

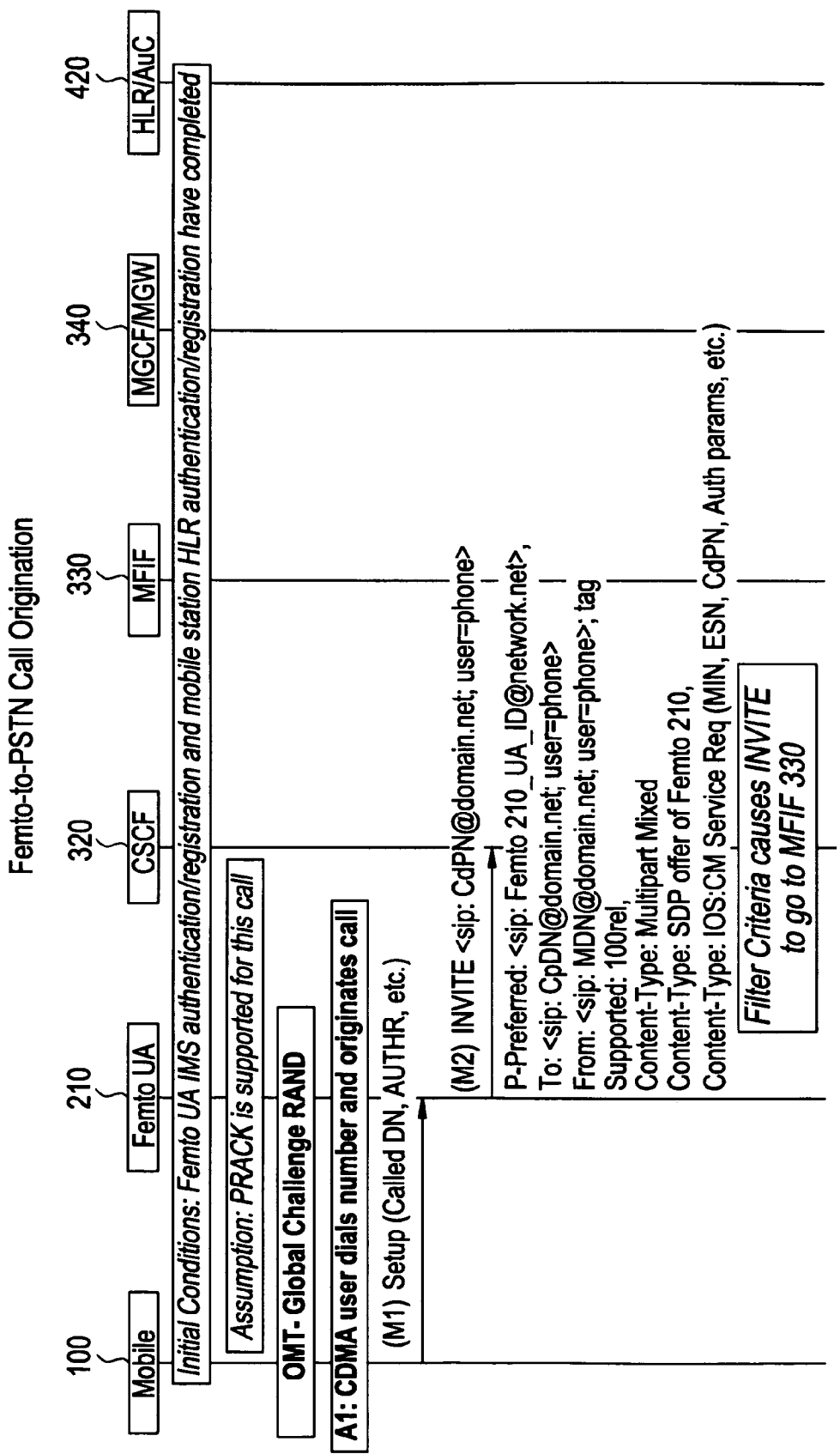

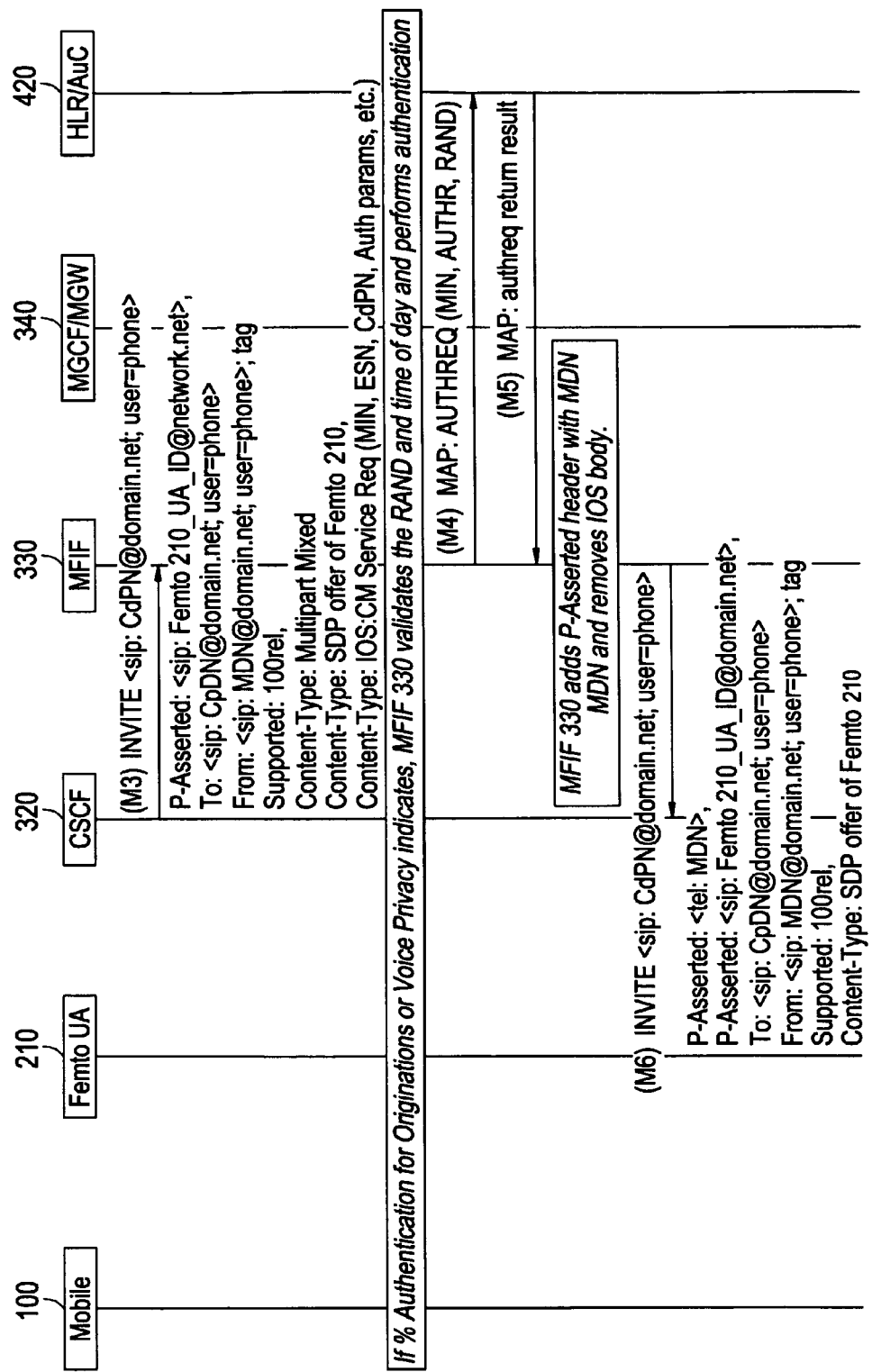

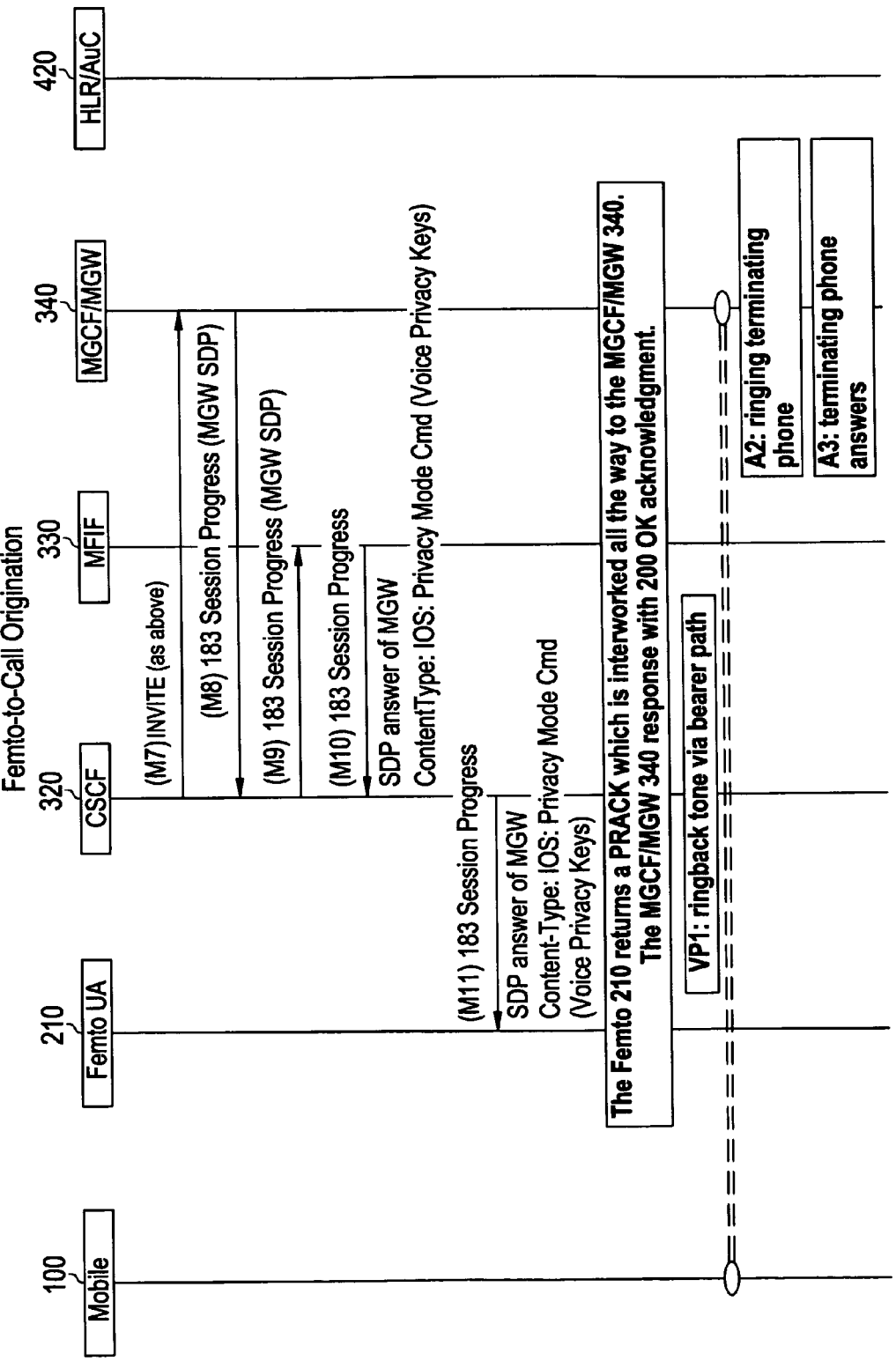

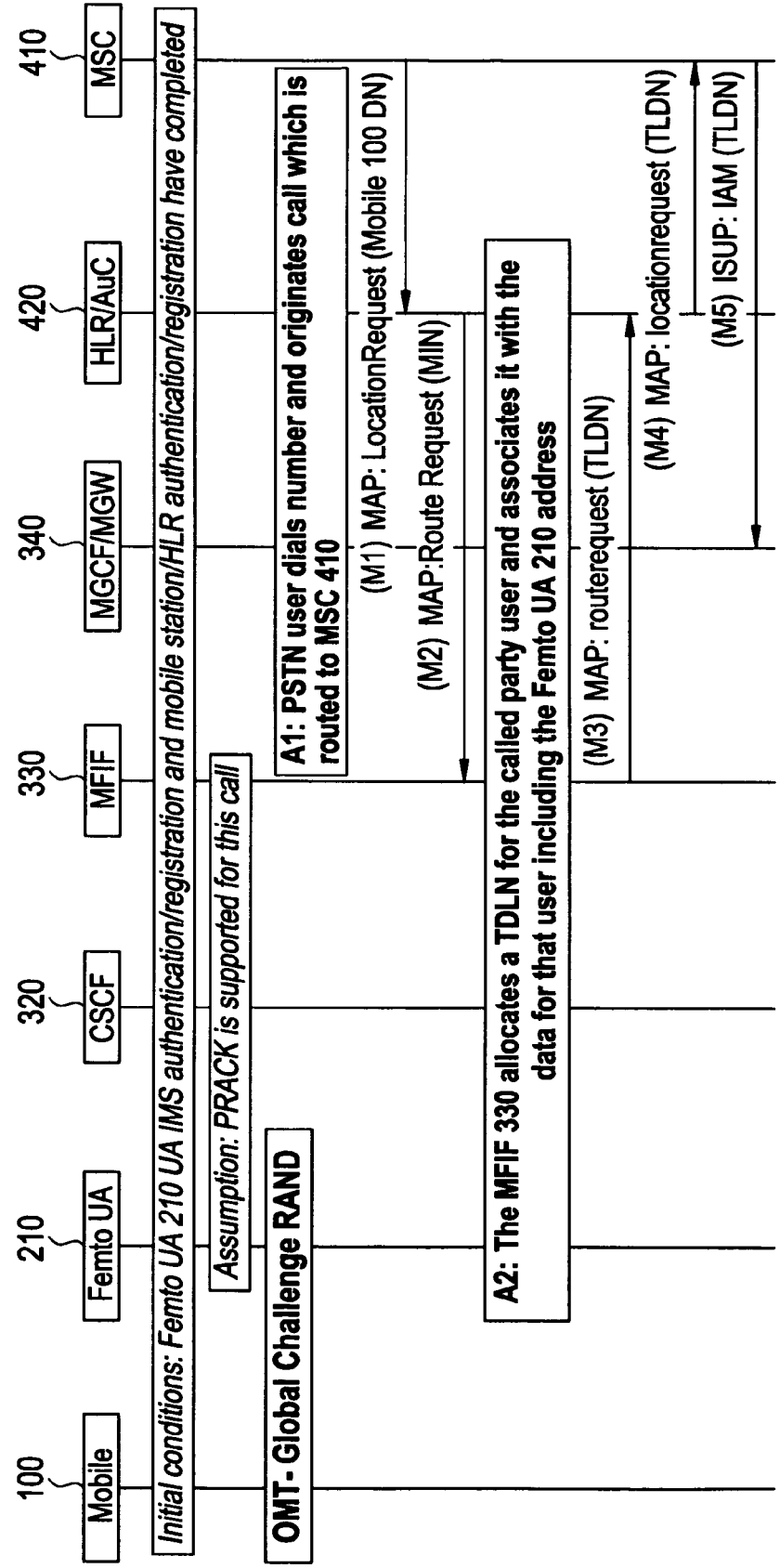

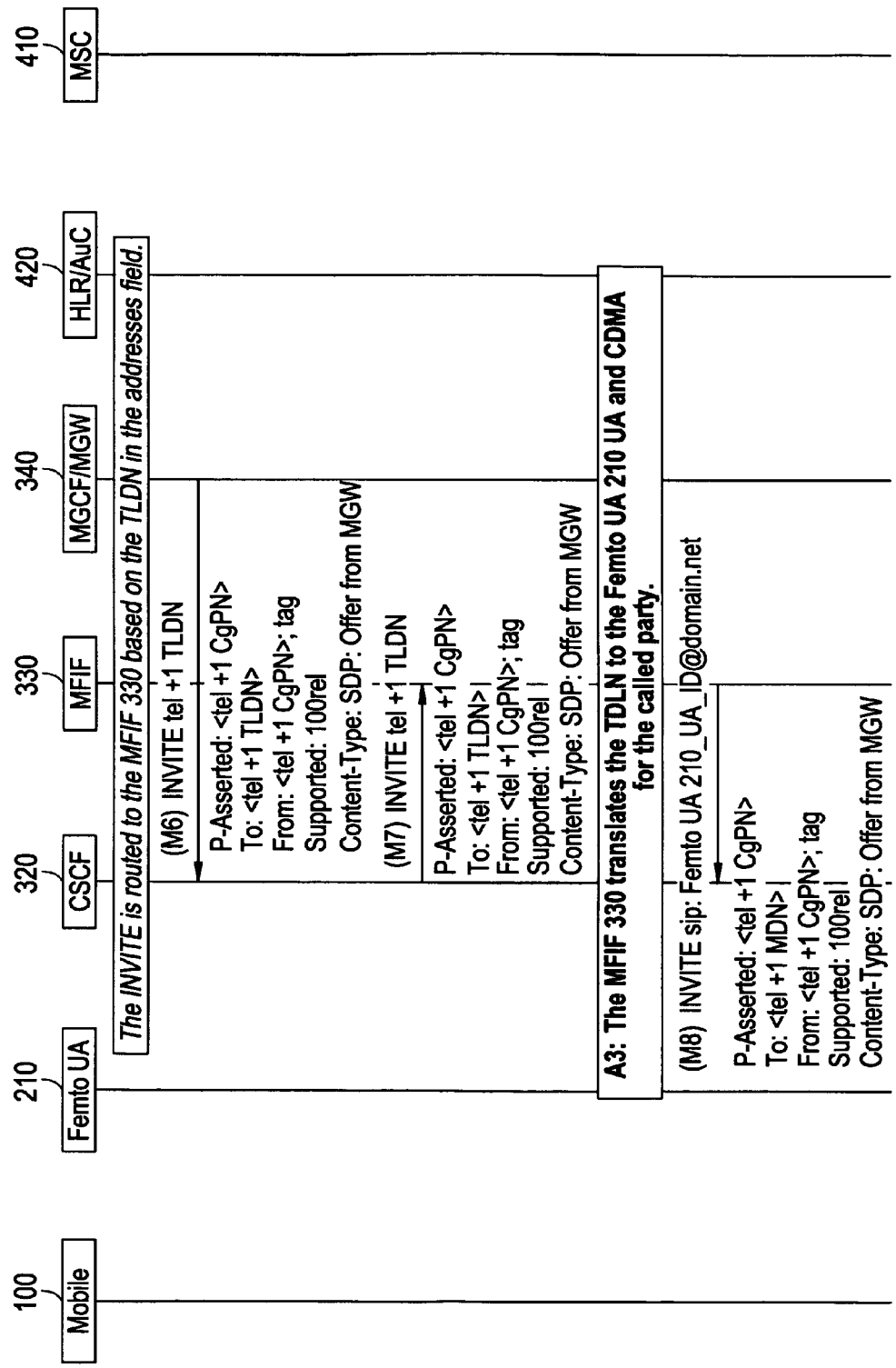

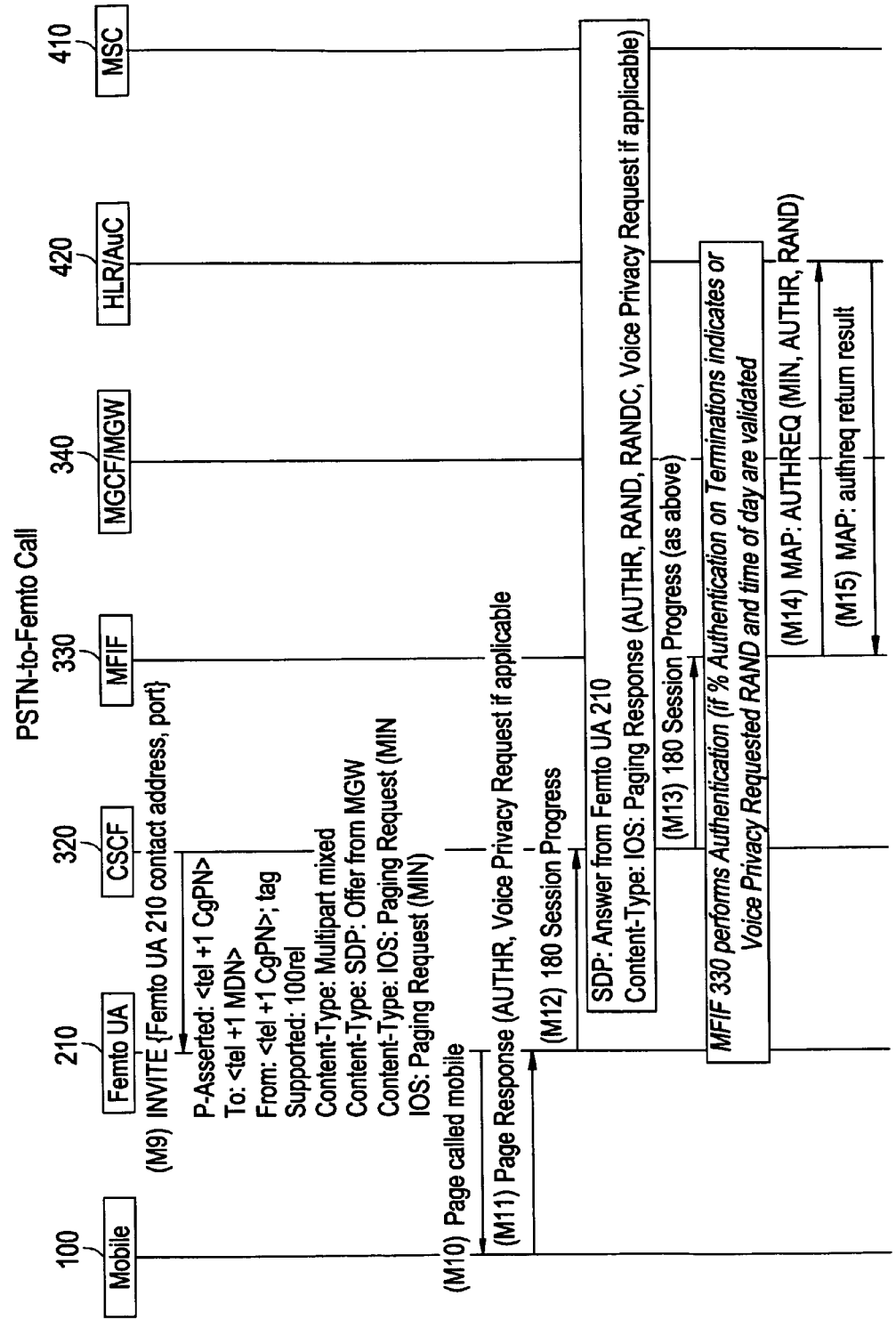

PSTN-to-Femto Call

METHODS FOR PROVISIONING MOBILE STATIONS AND WIRELESS COMMUNICATIONS WITH MOBILE STATIONS LOCATED WITHIN FEMTOCELLS

PRIORITY STATEMENT

This non-provisional patent application claims priority under 35 U.S.C. §119(e) to provisional patent application Ser. No. 61/000,575, filed on Oct. 26, 2007, the entire contents of which is incorporated herein by reference.

BACKGROUND OF THE INVENTION

A Femto base station is basically a low cost and low power base station transceiver which is installed indoors (e.g., in a home or office) and connected to the Internet via cable, DSL, on-premise fiber optic link, or a similar IP backhaul technology. This connection is used to integrate the Femto base station with the wireless operator's core network.

A Femto base station serves a geographic area known as a Femtocell over a single carrier or channel. In a wireless network including Femtocells, upon entering a Femtocell, a mobile station receives broadcast overhead messages consistent with well-known standards such as current 3GPP2 CDMA2000 EVDO standards (e.g., 3GPP2 CDMA2000 EVDO standard "cdma2000 High Rate Packet Data Air Interface Specification," 3GPP2 C.S0024-B, Ver. 2.0 (March 2007)), etc.

When CDMA mobile stations are connected to an IP Multimedia Subsystem (IMS) via a circuit connection (e.g., a CDMA Femtocell) the IMS emulates a Visited Mobile Switching Center (V-MSC)/Visitor Location Register (VLR) in the CDMA mobility network model. In the CDMA mobility network model, the V-MSC/VLR does not have provisioned subscriber data associated with each user that may receive service. Instead, the V-MSC/VLR registers with a Home Location Register (HLR) and dynamically retrieves the subscriber data necessary to provide services for the CDMA users currently served by the V-MSC/VLR.

However, IMS is based on a wireline model, in which case the users of the IMS must be pre-provisioned as subscribers on the IMS before they are allowed even basic access. The conflict between the provisioning strategies for a CDMA network and IMS becomes an issue when using the IMS as a V-MSC/VLR.

This problem relating to provisioning strategies will also apply to UMTS users connected to UMTS Femtocells.

Conventionally, a solution to the provisioning strategy conflict operates on the assumption that there is a pre-provisioned subscriber record on the IMS for each CDMA user that is authorized access through a given CDMA Femtocell. This is often envisioned as a semi-automated provisioning process based on the placing of a CDMA user on an Access Control List (ACL) or Authorized User List (AUL) associated with each Femtocell. However, this scheme has at least three problems.

A first problem is referred to herein as the "coffeeshop" or "public" Femtocell that does not have an ACL of users allowed access. In this case, given that there is no ACL generated for the Femtocell, there is no way of triggering the HSS population of an IMS subscriber record for the CDMA users of such a coffeeshop or public Femtocell.

Another problem is that service providers conventionally have provided feedback that the per-user IMS subscriber record is not acceptable to them. Service providers want the Femtocell system to be able to operate with dynamic data (e.g., just the VLR download) and not be dependent on any per-user pre-provisioned data.

Still another problem is that a pre-provisioning solution generally requires access to the CDMA users' CDMA service provider back office provisioning systems. Because service providers do not allow other service providers to access their back-office provisioning systems, there is a problem supporting CDMA users from another service provider on a Femtocell served by a particular service provider. For example, if a given Femtocell is connected to a Verizon Wireless IMS and back-office system network, it will not be possible for Sprint or Alltel users to get service on that Femtocell because the pre-provisioning process will be blocked due to inability to access the Sprint or Alltel back-office provisioning systems from the Verizon system.

SUMMARY OF THE INVENTION

Example embodiments are directed towards methods for provisioning mobile stations and wireless communications with mobile stations located within femtocells.

A method for wireless communications includes registering a femtocell with an IMS core network to receive IMS services for at least one mobile station located within the femtocell; and separately registering the mobile station with an application server to provide additional services to the mobile station located within the femtocell. The additional services are CDMA services.

Registering the femtocell with the IMS core network includes transmitting femtocell registration information to the IMS core network to request IMS services for a mobile station located within the femtocell. The femtocell registration information does not include information regarding the mobile station.

The method may also include receiving authentication keys from the IMS core network; preparing authentication response based on the received authentication keys and stored femtocell information; and sending the prepared authentication response to the IMS core network to receive IMS services.

Further, the method may include receiving a global random key from the IMS core network once the femtocell is registered; deriving a challenge using the received key and a time value; transmitting the challenge to the mobile station; and providing services to the mobile station responding to the transmitted challenge.

Separately registering the mobile station with the application server includes receiving an authentication response to a global challenge from a mobile station; generating a first SIP message associated with the mobile station based on the authentication response; sending the first SIP message to the IMS core network to register the mobile station for the additional services; receiving a second SIP message from the IMS core network; and providing information to the mobile station regarding the registration for additional services.

The first SIP message includes at least one of an electronic serial number of the mobile station, a mobile identification number of the mobile station, a random number, and a time value. The second SIP message includes a mobile directory number for the mobile station.

The method may also include receiving a call setup request from the mobile station including the called party number (CpDN); generating a SIP message including the CpDN and mobile station information; and sending the generated SIP message to an IMS core network to notify the IMS core network of the call request. The SIP message includes the information associated with the mobile station in a sub address of the SIP message. Further, the information associated with the mobile station includes at least one of the mobile identification number, electronic serial number, and mobile directory number.

Still further, the method may include receiving a SIP message including a paging request and at least one of a mobile identification number and mobile directory number from the IMS core network; paging a mobile station based on the SIP message including the paging request; receiving paging response from the mobile station; and providing the paging response to the IMS core network.

Another method for wireless communications includes receiving registration information for IMS services from a femtocell; generating a global random key; and sending the global random key to the femtocell. The registration information does not include information regarding a mobile station located within the femtocell. The global random key is used to send a challenge to a mobile station located within the femtocell.

This method may also include receiving mobile station information from a user agent of the femtocell to register the mobile station for CDMA services; authenticating the mobile station based on the mobile station information; registering with a home location register (HLR) as a visiting location register (VLR); receiving a VLR profile from the HLR based on the mobile station information; and communicating with the mobile station as the VLR. The mobile station information includes at least one of an electronic serial number, mobile identification number, random number received by the mobile station, an authentication response generated by the mobile station, and a time value. The time value is associated with a time of day and is used to determine the random number is valid.

This method treats the femtocell as an endpoint for the IMS services and CDMA services provided to mobile stations located within the femtocell.

Further, the method may includes receiving a message including the mobile station information and a called party number; authenticating the mobile station based on the mobile station information; generating an authentication request message including the mobile station information once the mobile station is authenticated; sending the authentication request to the HLR; and providing a second SIP message including a mobile directory number for the mobile station to establish communication path with a mobile station associated with a called party number.

According to this method, authenticating the mobile station includes inputting the global random key and time value into a function to generate a random number; and verifying the generated random number is within an allowable range.

The method may also include receiving a routing request including a mobile identification number of the mobile station; associating a temporary local directory number with the mobile station; triggering generation and transmission of a SIP message to a femto user agent associated with the mobile station; receiving a response to the SIP message; authenticating the mobile station based on the response; acting as the VLR during establishment of a traffic channel between the mobile station and a mobile station initiating the call to the mobile station located within the femtocell if the mobile station is authenticated. The SIP message includes the mobile identification number of the mobile station in a sub address.

Authenticating the mobile station may include inputting the global random key and time value into a function to generate a random number; and verifying the generated random number is within an allowable range.

A method for IP Multimedia Subsystem (IMS) communication includes transmitting femtocell registration information to an IMS core network to request IMS services for a mobile station located within the femtocell. According to this method, the femtocell registration information does not include information regarding the mobile station. For example, the femtocell registration information may only include information regarding the femtocell.

BRIEF DESCRIPTION OF THE DRAWINGS

The above and other features and advantages of example embodiments will become more apparent by reviewing the following detailed description of this disclosure with reference to the attached drawings in which:

FIG. 2 is a signal flow diagram illustrating an IMS registration/authentication performed by the Femto user agent (UA) when the Femtocell powers up;

DETAILED DESCRIPTION OF EXAMPLE EMBODIMENTS

In the following description, for purposes of explanation and not limitation, specific details are set forth such as particular architectures, interfaces, techniques, etc., in order to provide a thorough understanding of the present invention. However, it will be apparent to those skilled in the art that teachings of the present invention may be practiced in other illustrative embodiments that depart from the specific details described with respect to FIGS. 1-6. In some instances, detailed descriptions of well-known devices, circuits, and methods are omitted from this application so as not to obscure the description of the present invention with unnecessary detail. All principles, aspects, and embodiments of the present invention, as well as specific examples thereof, are intended to encompass both structural and functional equivalents thereof. Additionally, it is intended that such equivalents include both currently known equivalents as well as equivalents developed in the future.

Example embodiments are discussed herein as being implemented in a suitable computing environment. Although not required, example embodiments will be described in the general context of computer-executable instructions, such as program modules or functional processes, being executed by one or more computer processors or CPUs. Generally, program modules or functional processes include routines, programs, objects, components, data structures, etc. that perform particular tasks or implement particular abstract data types. The program modules and functional processes discussed herein may be implemented using existing hardware in existing communication networks. For example, program modules and functional processes discussed herein may be implemented using existing hardware of a Femto base station, application server of an IMS, etc.

In the following description, illustrative embodiments will be described with reference to acts and symbolic representations of operations (e.g., in the form of signal flow diagrams that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Figure 1:
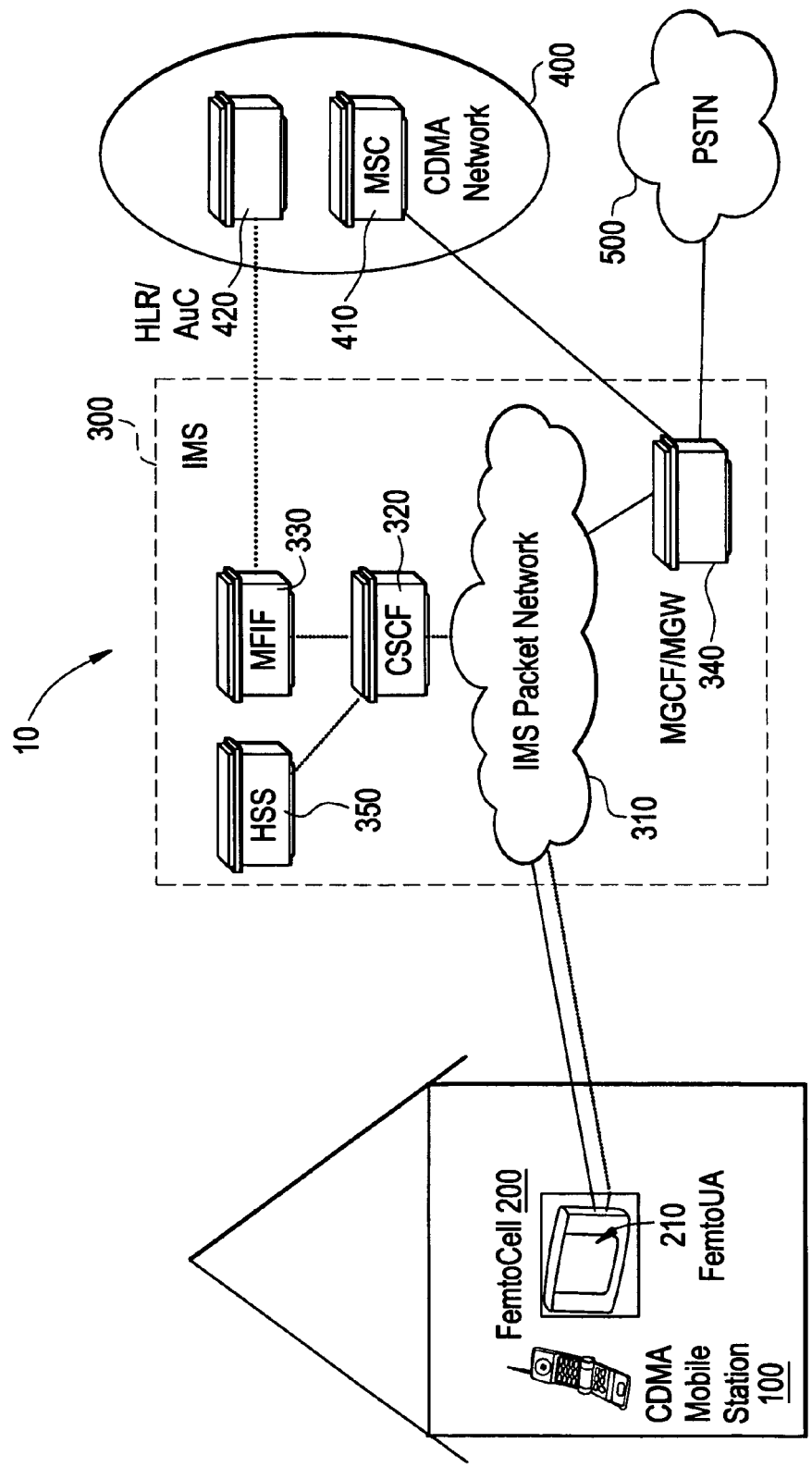
FIG. 1 illustrates an example wireless communications system.

FIG. 1 illustrates portions of a telecommunications system 10 in which example embodiments described below may be implemented. The telecommunications system 10 includes a CDMA mobile station 100, a Femtocell 200, an IMS 300, a CDMA network 400 and a PSTN 500. The Femtocell 200 refers to the coverage area supported by a Femtocell base station router, and the Femtocell base station router includes a user agent (Femto UA) 210. Hereinafter, the term Femtocell is used interchangeably with the base station of a Femtocell and/or base station router of a Femtocell. The IMS 300 includes an IMS Packet Network 310, a CSCF 320, an application server (AS) referred to herein as a MAP Femto Interworking Function (MFIF) 330, a MGCF/MGW 340, and a Home Serving System (HSS) 350. The CDMA network 400 includes a MSC 410 and a HLR/AuC 420.

FIG. 1 shows only a single mobile station 100. It will be understood, however, that the Femtocell 200 provides communication services to any number of mobile stations. As described herein, a mobile station refers to, for example, a cellular telephone, a portable computer, a pocket computer, a hand-held computer, a personal digital assistant (PDA), a car-mounted mobile device, or the like which communicates voice and/or data.

Example embodiments described below are primarily directed towards methods performed by the Femto UA 210 and the MFIF 330. Methods of wireless communication involving a Femto UA 210 including an IMS subscription which proceeds with normal authentication and registration when the Femtocell powers up are described below. CDMA mobile stations 100 are treated as "guests" by the Femto UA 210, and the Femto UA 210 communicates with the IMS 300 on behalf of each CDMA mobile station 100. In the methods for wireless communication described below, the registration/authentication relating to IMS services is separate and different from the registration/authentication relating to CDMA services.

FIG. 2 is a signal flow diagram illustrating an IMS registration/authentication performed by the Femto UA 210 when the Femtocell powers up. It is noted that the HSS 350 stores a Femto UA subscription including authentication secret data, and the Femtocell 200 stores IMS authentication data used to provide appropriate authentication responses in order to receive services from the IMS 300 including providing a connection to the MFIF 330.

Referring to FIG. 2, activation of the Femtocell 200 (A1) is shown as beginning a registration process for the Femto UA 210 relating to IMS services to be provided to mobile stations 100 located within the Femtocell 200. The Femto UA 210 initiates registration with an IMS 300 by generating a Session Initiation Protocol (SIP) registration message (REGISTER). The Femto UA 210 sends the registration message to the CSCF 320 (M1). As shown in FIG. 2, the registration message includes information identified in a "From", "To" and "Contact" field. This information relates only to the Femto UA 210 and does not include information relating to mobile stations 100 located within the Femtocell 200.

The CSCF 320 receiving the registration message queries the HSS 350 for authentication data for the Femto UA 210 (A2). The CSCF 320 generates authentication information based on information received in response to the query of the HSS 350. The authentication information generated or used by the CSCF 320 is well-known and may include an authentication key agreement (AKA), random number (RAND), Authentication token (AUTN), integrity key (IK) and cipher key (CK), for example. The CSCF 320 communicates the authentication information to the Femto UA 210 in a SIP 401 message indicating user authentication is required (M2)

In response to receiving the SIP 401 message, the Femto UA 210 sends a second registration message to the CSCF 320 (M3). The second registration message includes an authentication response. The authentication response is the output of an authentication algorithm with a series of inputs, some provided to the Femto UA 210 as part of each authentication event and some known to both the IMS 300 and the Femto UA 210 and not passed during the authentication event.

The CSCF 320 processes the second registration message including the authentication response to verify credentials of the Femto UA 210. As previously mentioned, the IMS 300 is provisioned with a Femto UA subscription including authentication secret data, and the Femto UA 210 stores the IMS authentication data. As such, the HSS 350 or CSCF 320 may use this information to verify credentials of the Femto UA 210. If the Femto UA 210 is verified, the CSCF 320 queries the HSS 350 for a user profile and downloads the user profile associated with the Femto UA 210 from the HSS 350 (A3). The user profile downloaded from the HSS 350 is associated with the Femto UA 210 and does not include information regarding mobile stations 100 located within the Femtocell 200. The user profile includes filter criteria indicating which applications servers to include on each call type and an IMS registration validity time value to de-register the Femto UA if re-registration does not occur.

Essentially, the Femto UA 210 is requesting permission to communicate IMS services to mobile stations 100 located within the Femtocell 200.

Once the Femto UA 210 is verified and the user profile is downloaded, the CSCF 320 generates a SIP 200 OK message indicating the Femto UA 210 was verified and sends the SIP 200 OK message to the Femto UA 210 (M4) to notify the Femto UA 210 of registration with the MFIF 320. If indicated in the filter criteria downloaded for the Femto UA 210, the CSCF 320 also generates and sends a third party registration message to the MFIF 330 to provide registration status information for the Femto UA 210 to the third party application server, i.e., the MFIF 330 (M5). The MFIF 330 responds to the third registration message with a SIP 200 OK response (M6).

The MFIF 330 also generates a global random key Global_RAND_Key in response to receiving the third party registration message (A4). The global random key may be a 64 bit key, for example. Further, the MFIF 330 generates a SIP message and sends the generated key to the CSCF 320 in the generated SIP message (M7). It is noted that conventionally, IMS authentication would be performed with Femto specific keys provisioned in the Femto and the HSS rather than the randomly generated or selected global random key mentioned above.

The CSCF 320 forwards the SIP message including the generated key to the Femto UA 210 (M8). The Femto UA 210 processes the received message and sends a SIP 200 OK response to the CSCF 320 (M9). Further, the Femto UA 210 extracts the global random key from the message and derives a random number RAND based on the key and time of day using a standard hashing algorithm such as SHA-1, for example (A5). The Femto UA 210 then broadcasts the random number RAND in an overhead message train (OMT) (A6).

The CSCF 320 forwards a SIP 200 OK message to notify the MFIF 330 of completion of the registration of the Femto UA 210 with the MFIF 330 (M10).

Accordingly, mobile stations 100 may receive the broadcast random number RAND and request IMS services via the Femto UA 210 as "guests" of the Femto UA 210. It is noted that the above-described registration process does not require information relating to the mobile stations 100 be provided to the IMS 300. As such, the example embodiment described above does not suffer from the problems of conventional techniques described in the background section of this disclosure.

Figure 3B:
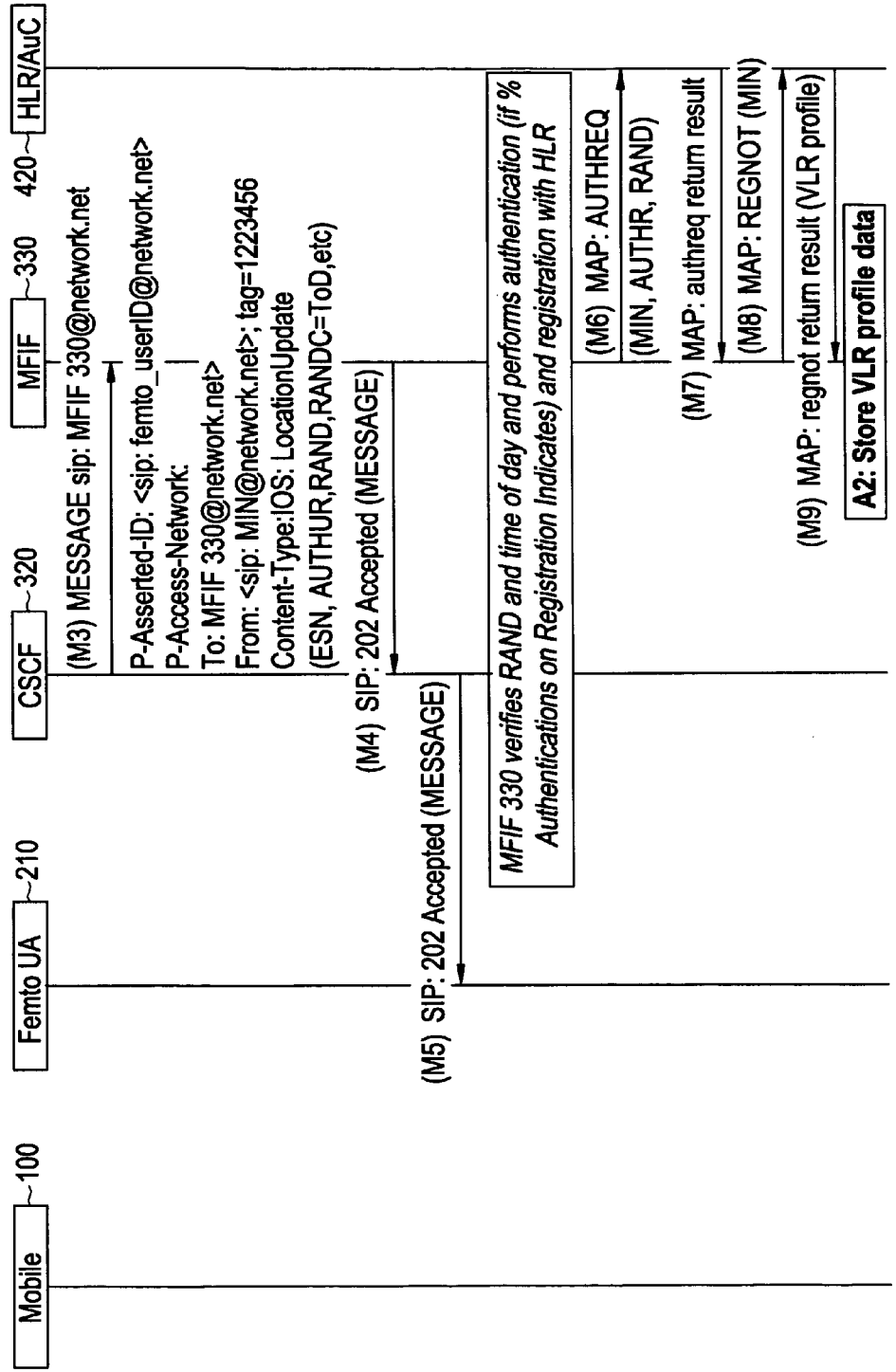
FIG. 3 is a signal flow diagram illustrating registration for a CDMA mobile station located within a Femtocell.
Figure 3C:
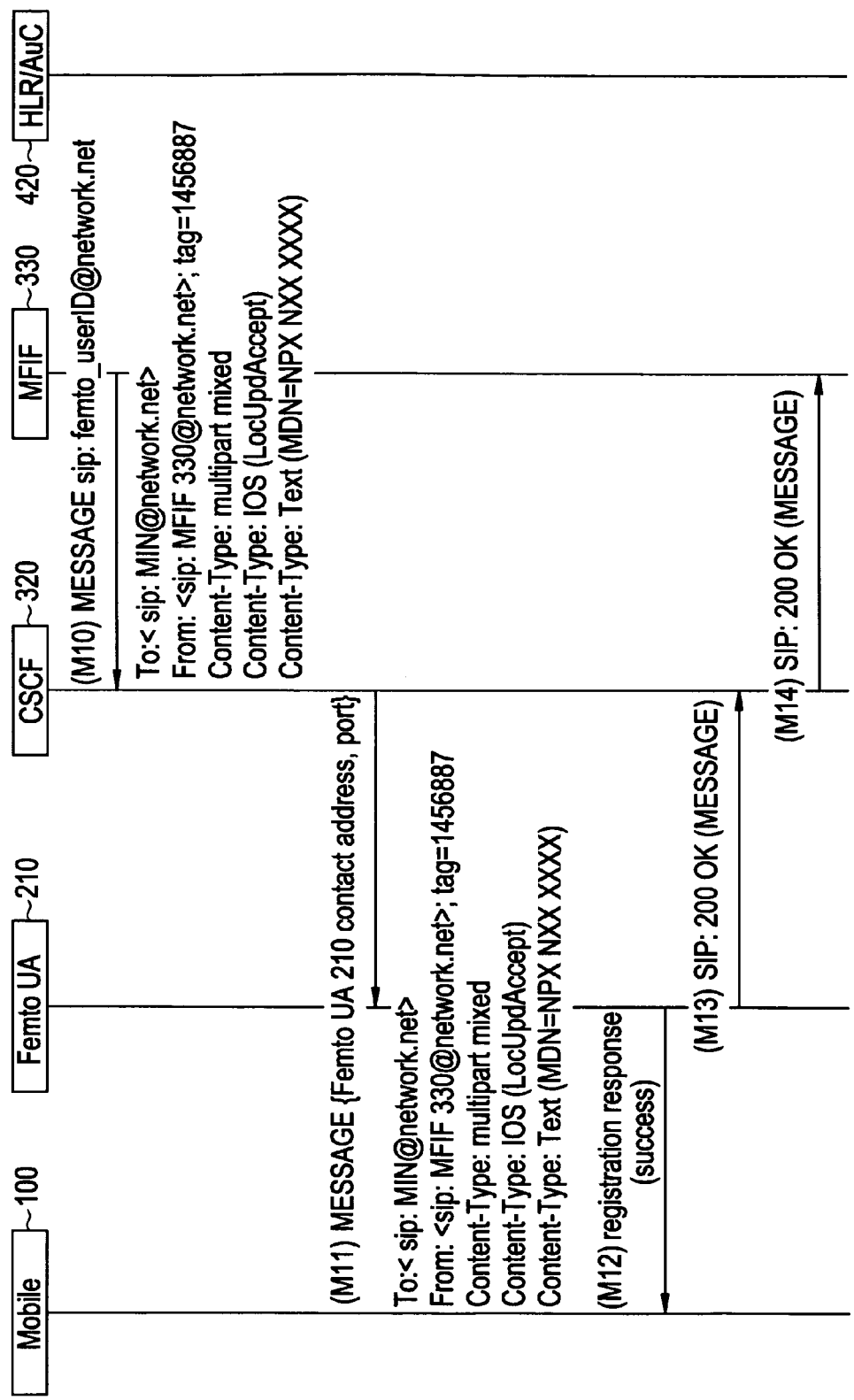

FIG. 3 is a signal flow diagram illustrating registration for a user of a CDMA mobile station 100 located within a Femtocell 200. The signal flow diagram of FIG. 3 shows communications between the mobile station 100, Femto UA 210, CSCF 320, MFIF 330, and HLR/AuC 420. The Femto UA 210 shown in FIG. 3 is assumed to have already registered with the IMS 300. For example, the Femto UA 210 may have registered using the registration method described above with respect to FIG. 2. Further, the Femto UA 210 is broadcasting a global challenge RAND.

Referring to FIG. 3, the mobile station 100 receives the global challenge RAND, and begins a CDMA registration process with the Femto UA 210 (A1). The mobile station 100 runs a CDMA CAVE authentication algorithm and communicates an authentication response AUTHR to the Femto UA 210 to begin CDMA registration (M1). It is noted that CDMA CAVE algorithms are well-known and thus, not discussed herein for the sake of brevity.

The Femto UA 210 receives the AUTHR and generates a SIP MESSAGE. The SIP MESSAGE contains location update information including the mobile identification number MIN, an electronic serial number ESN, the AUTHR, a random number RAND, and a parameter RANDC to carry the time of day. In particular, the time of day is used as input to generate the RAND, and the RANDC is an existing parameter in which to carry the time of day. The MIN and ESN are numbers related to the mobile station 100 and are not related to the Femto UA 210. The generated SIP message is sent to the CSCF 320 (M2).

The CSCF 320 forwards the SIP message based on an address identifying the MFIF 330 to the MFIF 330 (M3). The MFIF 330 processes the received message, and sends a SIP 202 message to the CSCF 320 indicating the SIP 202 Message has been accepted (M4). The CSCF 320 sends the SIP 202 message to the Femto UA 210 (M5).

Still referring to FIG. 3, the MFIF 330 verifies the RAND is correct for the specified inputs of the global random key and time of day and that the time of day used in the RAND generation is within an allowable time interval. The MFIF 330 also performs authentication and registration with the HLR/AuC 420. This authentication and registration allows the MFIF 330 to act as a VLR. In particular, the MFIF 330 generates and sends an ANSI-41 MAP message including an authentication request AUTHREQ to the HLR/AuC 420 (M6). The authentication request includes the mobile identification number (MIN), the AUTHR generated by the mobile station 100, and the RAND. In response to receiving this information, the HLR/AuC 420 prepares and sends a MAP message including an authentication request return result (M7).

A registration notification REGNOT will take place between the MFIF 330 and the HLR/AuC 420 (M8 and M9).

Following this registration notification, the MFIF 330 receives VLR profile data from the HLR/AuC 420 and stores this VLR profile data in the MFIF 330 (A2). The VLR profile data includes information regarding the mobile station 100 such as services activation status and origination restrictions, as well as a mobile DN for the user.

The MFIF 330 generates and communicates a SIP message to the CSCF 320 (M10) to notify the Femto UA 210 of the success or failure of the authentication or registration process. If the authentication and registration was successful, the MFIF 330 also includes the mobile directory number MDN for the CDMA mobile station 100. The CSCF 320 forwards the SIP message to the Femto UA 210 (M11). The Femto UA 210 provides a location update response to the mobile station 100 (M12), and responds to the CSCF 320 with a SIP 200 OK message (M13). The CSCF 320 provides the SIP 200 OK message to the MFIF 330 (M14) to complete registration for the mobile station 100 with the MFIF 330.

As described above with respect to FIG. 3, the registration for receiving CDMA services involves providing information associated with the CDMA mobile station 100 and an authentication event to the MFIF 330, whereas the registration for IMS services described with respect to FIG. 2 involves providing information related only to the Femto UA 210 to the IMS 300. The information associated with the CDMA mobile station 100 provided during registration for CDMA services includes an ESN, MIN and AUTHR, for example.

Figure 4D:
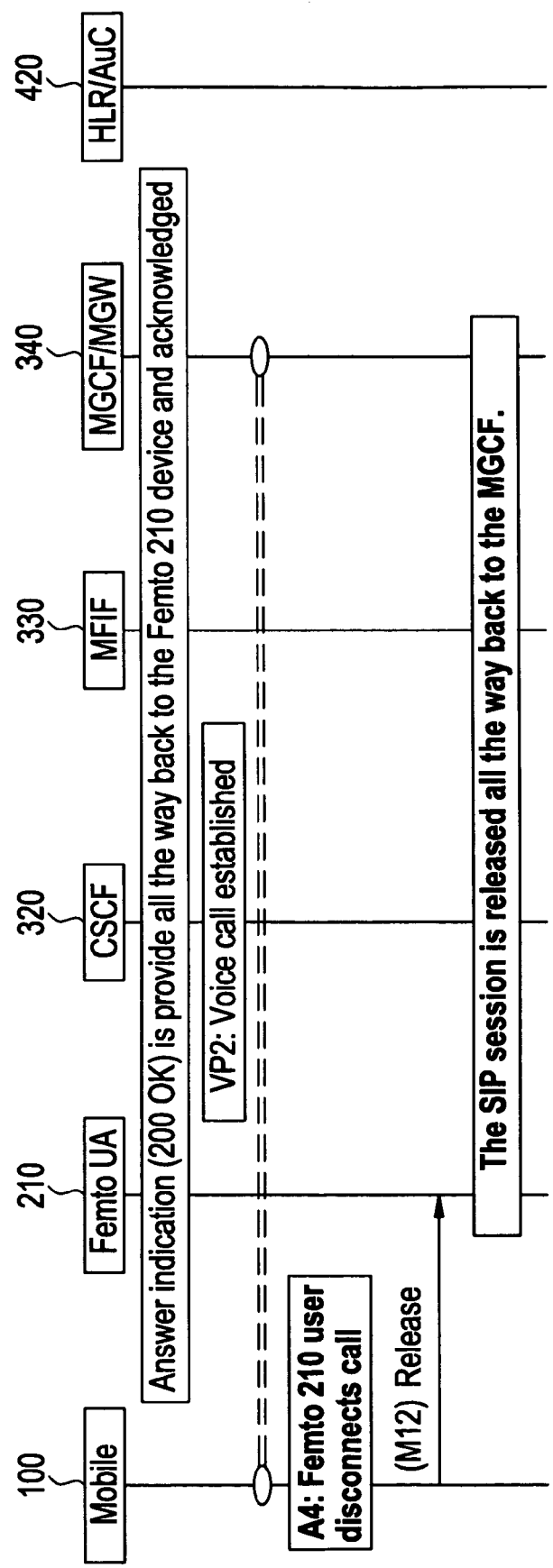
FIG. 4 is a signal flow diagram illustrating operations and messages sent relating to a call initiated by a mobile station located within a Femtocell.
Figure 5D:
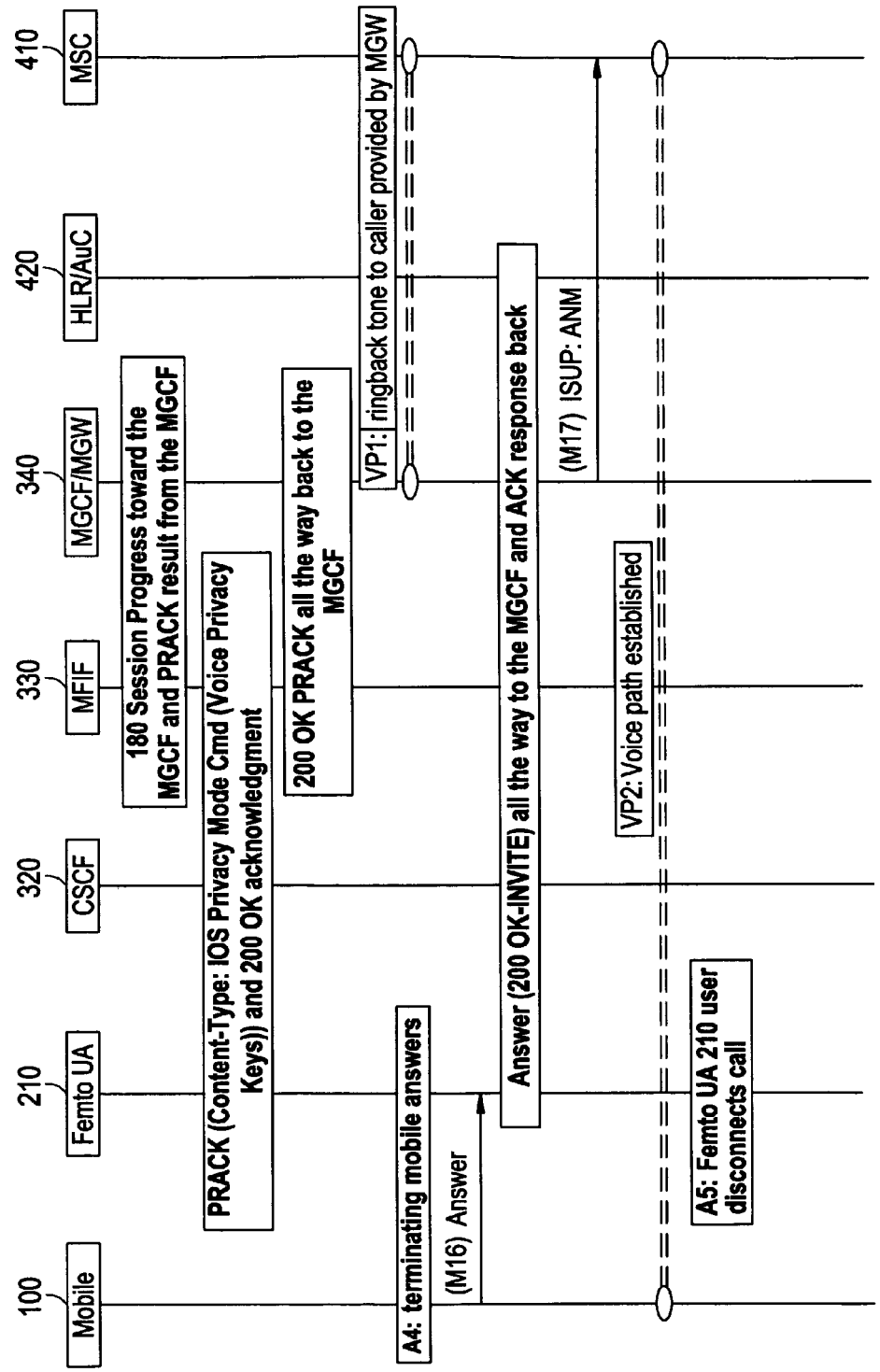
FIG. 5 is a signal flow diagram illustrating operations and messages sent relating to a call intended for a mobile station located within a Femtocell.
Figure 5E:
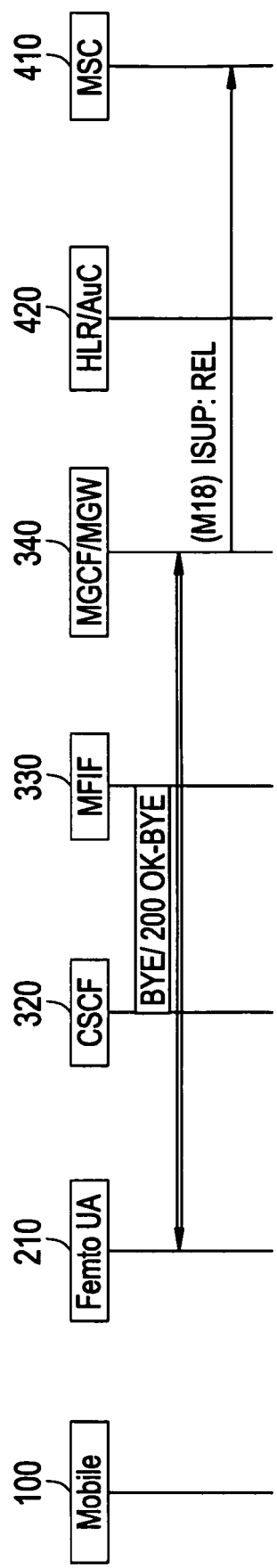

FIGS. 2 and 3 above are directed towards a method for registering for IMS services and CDMA services, respectively. FIGS. 4 and 5 relate to a method of call origination and call termination, respectively.

Referring to FIG. 4, the Femto UA 210 is broadcasting a global challenge RAND to mobile stations 100 within the Femtocell 200. The Femto-to-PSTN call origination begins with a mobile station 100 user dialing a number (A1). A set up message including the called dialed number DN and AUTHR is sent from the mobile station 100 to the Femto UA 210 (M1). The Femto UA 210 generates a SIP INVITE message including information related to the mobile station 100 such as the MIN, ESN, CdPN, authentication parameters, etc. As such, the Femto UA 210 is seen as the call originator (i.e., the endpoint) by the IMS 300. However, the Femto UA 210 includes the mobile identity MDN or MIN in a sub address header of the SIP INVITE message.

The SIP INVITE message is sent to the CSCF 320 (M2). Filtering criteria of the CSCF 320 will result in the SIP INVITE message being forwarded to the MFIF 330 (M3). The MFIF 330 may authenticate the mobile station 100 based on information associated with the mobile station 100. If the mobile station 100 is authenticated, the MFIF 330 allows the call to continue and replaces the Femto UA 210 information in the fields used to identify the calling party with the mobile station 100 information and allows the origination to proceed with normal IMS call control and routing. The MFIF 330 verifies the RAND is correct for the specified inputs of the global random key and time of day and that the time of day used in RAND generation is within the allowable time interval. Based on this processing the MFIF 330 generates and sends an ANSI-41 MAP message to the HLR/AuC 420 (M4). The MAP message includes an authentication request having the MIN of the mobile station 100, the AUTHR, and the RAND. The HLR/AuC 420 generates and sends a MAP authentication request result to the MFIF 330 (M5) to respond to the MAP message received from the MFIF 330. In addition, the MFIF 330 generates and sends a SIP INVITE message including an MDN of the mobile station 100 to the CSCF 320 (M6). In an alternate embodiment, the call is allowed to continue without waiting for the authentication request result from the HLR/AuC 420.

In response to receiving the SIP INVITE message from the MFIF 330, the CSCF 320 sends a SIP INVITE message to the MGCF/MGW 340 (M7).

The MGCF/MGW 340 sends a SIP 183 Session Progress message back to the CSCF 320 (M8), and the CSCF 320 responds to the SIP 183 Session Progress message by sending a SIP 183 Session Progress message to the MFIF 330 (M9). The MFIF 330 sends a SIP 183 Session Progress message to the CSCF 320 (M10), and the CSCF 320 sends a SIP 183 Session Progress Message to Femto UA 210 (M11).

In response to the SIP 183 session progress message, the Femto UA 210 returns a PRACK which is interworked all the way to the MGCF/MGW 340. The MGCF/MGW 340 responds with a SIP 200 OK acknowledgement, and the bearer path for the ringback tone between the mobile station 100 and the MGCF/MGW 340 is created (VP1).

Still referring to FIG. 4, the called mobile station associated with the DN is notified of an incoming call (A2). If the user of the called mobile station answers (A3), an answer indication is provided to the mobile station 100 and a voice call is established (VP2). Once the mobile station 100 within the Femtocell 200 disconnects the call (A4), a release is sent from the mobile station 100 to the Femto UA 210 (M12), and the SIP session is released all the way back to the MGCF/MGW 340.

FIG. 5 illustrates communications between a mobile station 100, Femto UA 210, CSCF 320, MFIF 330, MGCF/MGW 340, HLR/AuC 420 and MSC 410. In FIG. 5, a PSTN user dials a number and originates a call which is routed to the MSC (A1). In this example, the number is a dialed number DN associated with a mobile station 100 currently located within the Femtocell 200. It is noted that the mobile station 100 is registered as being served by the MFIF 330 of the IMS 300 as previously described with respect to FIGS. 2 and 3.

In response to receiving the call routed to the MSC 410, the MSC 410 attempts to locate the mobile station 100 associated with the DN. In particular, the MSC 410 generates and sends an ANSI-41 MAP message to the HLR/AuC 420 (M1). The MAP message is a location request. The HLR/AuC 420 determines which mobile station 100 is associated with the DN and sends a routing request including the MIN of the mobile station 100 to the MFIF 330 (M2) as the current visited MSC.

The MFIF 330 allocates a temporary local directory number (TLDN) for the mobile station 100 identified by the MIN and associates the TLDN with the data for the identified mobile station 100 (A2). Further, the MFIF 330 provides the TLDN to the HLR/AuC 420 (M3). The HLR/AuC 420 provides the TLDN to the MSC 410 (M4), and the MSC 410 routes the call to the MGCF/MGW 340 (M5) using the TLDN as the called party address.

The MGCF/MGW 340 generates and sends a SIP INVITE message to the MFIF 330 based on the TLDN via the CSCF 320 (M6 and M7). The TLDN is included in the called party address field commonly called "request URI" of the SIP INVITE message.

In response to receiving the SIP INVITE message, the MFIF 330 translates the TLDN to the associated Femto UA 210 and CDMA mobile station 100 addresses (A3). In particular, the MFIF 330 generates a different SIP INVITE message. In this SIP INVITE message, the TLDN included in the "request URI" field (i.e., the destination address) is replaced with the Femto UA 210 address. The SIP INVITE message also includes a sub address "To" field having information regarding the mobile station 100 such as the MDN or MIN.

The SIP INVITE message generated by the MFIF 330 is sent to the CSCF 320 (M8). The CSCF 320 forwards this SIP INVITE message to the Femto UA 210 (M9). The SIP INVITE message includes the MDN or MIN of the mobile station 100.

The Femto UA 210 receives the SIP invite message, and pages the mobile station 100 (M10) based on the MDN or MIN included in the sub address of the received SIP INVITE message. The mobile station 100 responds to the page with a response including an AUTHR (M11). In response to the previously received SIP INVITE, the Femto UA 210 sends a SIP 180 Session Progress message including authentication information such as AUTHR, RAND and time of day used to generate the RAND to the CSCF 320 (M12), and the CSCF 320 provides the SIP 180 session progress message to the MFIF 330 (M13).

Still referring to FIG. 5, the MFIF 330 may perform authentication of the mobile station 100. If the mobile station 100 is authenticated a MAP message is provided to the HLR/AuC 420 (M14). The MAP message is an AUTHREQ including the MIN of the mobile station 100, the AUTHR provided by the mobile station 100 and the random number RAND. The HLR/AuC 420 returns a result to the MFIF 330 (M15).

One skilled in the art will appreciate that various session progress and PRACK messages are sent between the Femto UA 210, CSCF 320, MFIF 330, MGCF/MGW 340 and HLR/AuC 420 and MSC 450. Following the session progress and PRACK messages, a ringback tone is provided by the MGCF/MGW 340 to the user initiating the call (VP1), and the called mobile station 100 located within the Femtocell 200 is notified of the call.

Assuming the user of the called mobile station 100 answers the call (A4), an answer indication is sent from the mobile station 100 to the Femto UA 210 (M16). In response to the answering of the call, 200 OK (answer to INVITE) messages and acknowledgment ACK signals are communicated between the Femto UA 210, CSCF 320, MFIF 330, MGCF/MGW 340 and HLR/AuC 420 and MSC 450 in order to establish the voice path (VP2) between the called mobile station 100 and the calling party. FIG. 5 indicates an message indicating the call has been answered is sent from the MGCF/MFW 340 and the MSC 410 (M17), and a voice path (VP2) is established between the MSC 410 and mobile station 100. Once the Femto UA 210 user disconnects the call (A5), release messages (BYE/200 OK—BYE) and (M18) are sent and the established voice path is released.

Example embodiments being thus described, it will be obvious that the same may be varied in many ways. Such variations are not to be regarded as a departure from the teachings of this application, and all such modifications are intended to be included within the scope of this application.

We claim:

1. A method for wireless communications, the method comprising:
   registering a femtocell with an IP Multimedia Subsystem (IMS), core network to receive IMS services for at least one mobile station located within the femtocell; and
   registering the at least one mobile station with an application server to provide additional services to the at least one mobile station located within the femtocell, wherein the registering the at least one mobile station with the application server includes,
   receiving an authentication response to a global challenge from a the at least one mobile station,
   generating a first Session Initiation Protocol (SIP) message associated with the at least one mobile station based on the authentication response, the first SIP message includes a mobile identification number (MIN) of the at least one mobile station sending the first SIP message to the IMS core network to register the at least one mobile station for the additional services, and receiving a second SIP message from the IMS core network; and providing information to the at least one mobile station regarding the registration for additional services, the first SIP message further includes at least one of an Electronic Serial Number (ESN) of the at least one mobile station, the global challenge, and a time value, and the second SIP message includes a mobile directory number (MDN) for the at least one mobile station.

2. The method of claim 1, wherein the additional services are CDMA services.

3. The method of claim 1, wherein registering the femtocell with the IMS core network includes, transmitting femtocell registration information to the IMS core network to request IMS services for the at least one mobile station located within the femtocell, the femtocell registration information not including information regarding the at least one mobile station and only relating to a user agent of the femtocell.

4. The method of claim 3, further comprising:

receiving authentication keys from the IMS core network;

preparing the authentication response based on the received authentication keys and stored femtocell information; and sending the prepared authentication response to the IMS core network to receive IMS services.

5. The method of claim 4, further comprising:

receiving a global random key from the IMS core network once the femtocell is registered;

deriving a challenge using the received key and a time value;

transmitting the challenge to the mobile station; and providing services to the mobile station responding to the transmitted challenge.

6. The method of claim 1, further comprising:

receiving a call setup request from the mobile station including the called party number (CpDN);

generating a SIP message including the CpDN and mobile station information; and sending the generated SIP message to an IMS core network to notify the IMS core network of the call request.

7. The method of claim 6, wherein the SIP message includes the information associated with the mobile station in a sub address of the SIP message.

8. The method of claim 7, wherein the information associated with the mobile station includes at least one of the mobile identification number, electronic serial number, and mobile directory number.

9. The method of claim 1, further comprising:

receiving a SIP message including a paging request and at least one of a mobile identification number and mobile directory number from the IMS core network;

paging a mobile station based on the SIP message including the paging request;

receiving paging response from the mobile station; and providing the paging response to the IMS core network.

10. A method for wireless communications, the method comprising:

receiving registration information for IP Multimedia Subsystem (IMS) services from a femtocell, the registration information not including information regarding a mobile station located within the femtocell and only relating to a user agent of the femtocell;

generating a global random key;

sending the global random key to the femtocell, the global random key being used to send a challenge to a mobile station located within the femtocell;

receiving mobile station information from a user agent of the femtocell to register the mobile station for CDMA services;

authenticating the mobile station based on the mobile station information;

registering with a home location register (HLR) as a visiting location register (VLR), receiving a VLR profile from the HLR based on the mobile station information;

communicating with the mobile station as the VLR;

receiving a message including the mobile station information and a called party number;

authenticating the mobile station based on the mobile station information;

generating an authentication request message including the mobile station information once the mobile station is authenticated;

sending the authentication request to the HLR; and providing a second SIP message including a mobile directory number for the mobile station to establish communication path with a mobile station associated with a called party number.

11. The method of claim 10, wherein the mobile station information includes at least one of an electronic serial number, mobile identification number, random number received by the mobile station, an authentication response generated by the mobile station, and a time value.

12. The method of claim 11, wherein the time value is associated with a time of day and is used to determine the random number is valid.

13. The method of claim 10, wherein authenticating the mobile station includes inputting the global random key and time value into a function to generate a random number; and verifying the generated random number is within an allowable range.

14. The method of claim 10, further comprising:

receiving a routing request including a mobile identification number of the mobile station;

associating a temporary local directory number with the mobile station;

triggering generation and transmission of a Session Initiation Protocol (SIP) message to a femto user agent associated with the mobile station, the SIP message includes the mobile identification number of the mobile station in a sub address;

receiving a response to the SIP message;

authenticating the mobile station based on the response;

acting as the VLR during establishment of a traffic channel between the mobile station and a mobile station initiating the call to the mobile station located within the femtocell if the mobile station is authenticated.

15. The method of claim 14, wherein authenticating the mobile station includes inputting the global random key and time value into a function to generate a random number; and verifying the generated random number is within an allowable range.

16. The method of claim of claim 10, further comprising:
treating the femtocell as an endpoint for the IMS services and CDMA services provided to mobile stations located within the femtocell.

17. A femtocell for use in wireless communications, the femtocell comprising:
a user agent configured to communicate on behalf of the at least one mobile station with an IP Multimedia Subsystem (IMS) core network and to register the at least one mobile station with an application server to provide additional services to the at least one mobile station located within the femtocell, the femtocell configured to,
register the femtocell with the IMS core network to receive IMS services for the at least one mobile station located within the femtocell,
receive an authentication response to a global challenge from the at least one mobile station,
generate a first Session Initiation Protocol (SIP) message associated with the at least one mobile station based on the authentication response, the first SIP message includes a mobile identification number (MIN) of the at least one mobile station,
send the first SIP message to the IMS core network to register the at least one mobile station for the additional services,
receive a second SIP message from the IMS core network, and
provide information to the at least one mobile station regarding the registration for additional services, the first SIP message further includes at least one of an Electronic Serial Number (ESN) of the at least one mobile station, the global challenge, and a time value, and the second SIP message includes a mobile directory number (MDN) for the at least one mobile station.

18. An application server for use in wireless communications, the application server configured to,
receive a third party registration message for providing registration status information for a user agent of a femtocell,
receive location update information of a mobile station by a first Session Initiation Protocol (SIP) message from a user agent of the femtocell, the first SIP message includes a mobile identification number (MIN) of the at least one mobile station,
perform authentication and registration of the mobile station based on the received SIP message using a home location register and authentication center, and
generate and communicate a second SIP message to a Call Session Control Function (CSCF) to notify the user agent of the femtocell of success or failure of the authentication and registration process for the mobile station, the first SIP message further includes at least one of an Electronic Serial Number (ESN) of the at least one mobile station, a random number, and a time value, and the second SIP message includes a mobile directory number (MDN) for the at least one mobile station.

* * * * *